(12) United States Patent
Eisner (10) Patent No.: US 6,276,427 B1
(45) Date of Patent: Aug. 21, 2001

(54) SLATTED APRON

(75) Inventor: Karl Heinz Eisner, Neufahrn (DE)

(73) Assignee: EITEC Fuhrungsbahnschutz-Systeme GmbH, Eching (DE)

( * ) Notice: Subject to any disclaimer, the term of this patent is extended or adjusted under 35 U.S.C. 154(b) by 0 days.

(21) Appl. No.: 09/581,393

(22) PCT Filed: Nov. 17, 2000

(86) PCT No.: PCT/DE99/03395

§ 371 Date: Jul. 10, 2000

§ 102(e) Date: Jul. 10, 2000

(87) PCT Pub. No.: WO99/33608

PCT Pub. Date: Jul. 8, 1999

(30) Foreign Application Priority Data

Dec. 23, 1997 (DE) .............................................. 197 57 729

(51) Int. Cl.[7] .................................................. E06B 9/08
(52) U.S. Cl. .......................................... 160/133; 160/122
(58) Field of Search ................................ 160/133, 11, 32, 160/33, 23.1, 232, 235, 236, 231.2, 120, 122; 384/15, 16

(56) References Cited

U.S. PATENT DOCUMENTS

| | | | |
|---|---|---|---|
| 2,354,832 | * 8/1944 | Ristine | 160/11 |
| 2,430,827 | * 11/1947 | Rougemont | 384/15 |
| 2,551,860 | * 5/1951 | Welte et al. | 384/15 |
| 2,850,332 | 9/1958 | Begie . | |
| 3,114,222 | 12/1963 | Elford . | |
| 3,475,064 | * 10/1969 | O'Rourke | 384/15 |
| 3,965,960 | * 6/1976 | Massey | 160/11 X |
| 4,037,639 | * 7/1977 | Jones | 160/235 X |
| 4,493,169 | * 1/1985 | Loehrer | 160/122 X |
| 4,552,483 | * 11/1985 | Anderka et al. | 384/15 |
| 4,762,020 | * 8/1988 | Schmidberger et al. | 160/231.2 X |
| 4,867,578 | * 9/1989 | Komiya | 384/15 |
| 5,235,874 | * 8/1993 | Tabellini | 384/15 X |
| 5,871,312 | * 2/1999 | Haninger et al. | 160/231.2 X |

FOREIGN PATENT DOCUMENTS 40 33 541 A1  4/1992  (DE) .
44 26 483 A1  11/1995  (DE) .

* cited by examiner

Primary Examiner—David M. Purol
(74) Attorney, Agent, or Firm—Oliff & Berridge, PLC (57) ABSTRACT

A slatted apron for covering movable tool machine parts includes a multiplicity of links connected in an articulated manner which present a major surface presenting a cover surface portion and subsequent lateral surfaces. In this slatted apron, or the links are arranged, in an extended position wherein they are aligned along a straight line, in such a way that portions of their lateral surfaces are closely adjacent. Hereby matter such as, for example, chips may be prevented form getting into a zone between links to become jammed or wedged and, e.g. cause damage to the slatted apron.

15 Claims, 7 Drawing Sheets

SLATTED APRON

BACKGROUND OF THE INVENTION

1. Field of the Invention

The present invention relates to a slatted apron and in particular to a slatted apron used as a movable protective cover for machines.

2. Description of Related Art

In the prior art, various types of movable covers for machines are known. These covers are used to, e.g., protect the machine against the chips produced in processing and against coolant required in processing, in order to enhance the service life of the machine, prevent damage to sensitive parts of the machine, ensure reliability of the machine, prevent excessive soiling of the machine, etc.

One type of a movable protective cover for a machine is a telescopic cover. This telescopic cover may be used for various purposes in various constructional types.

Figure 6:
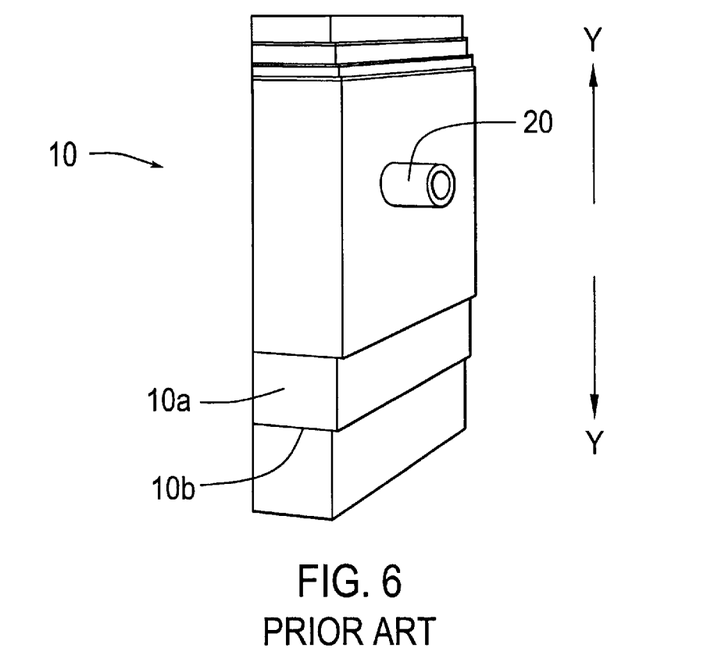
FIG. 6 shows a telescopic cover used as a spindle cover in the prior art.
Figure 7:
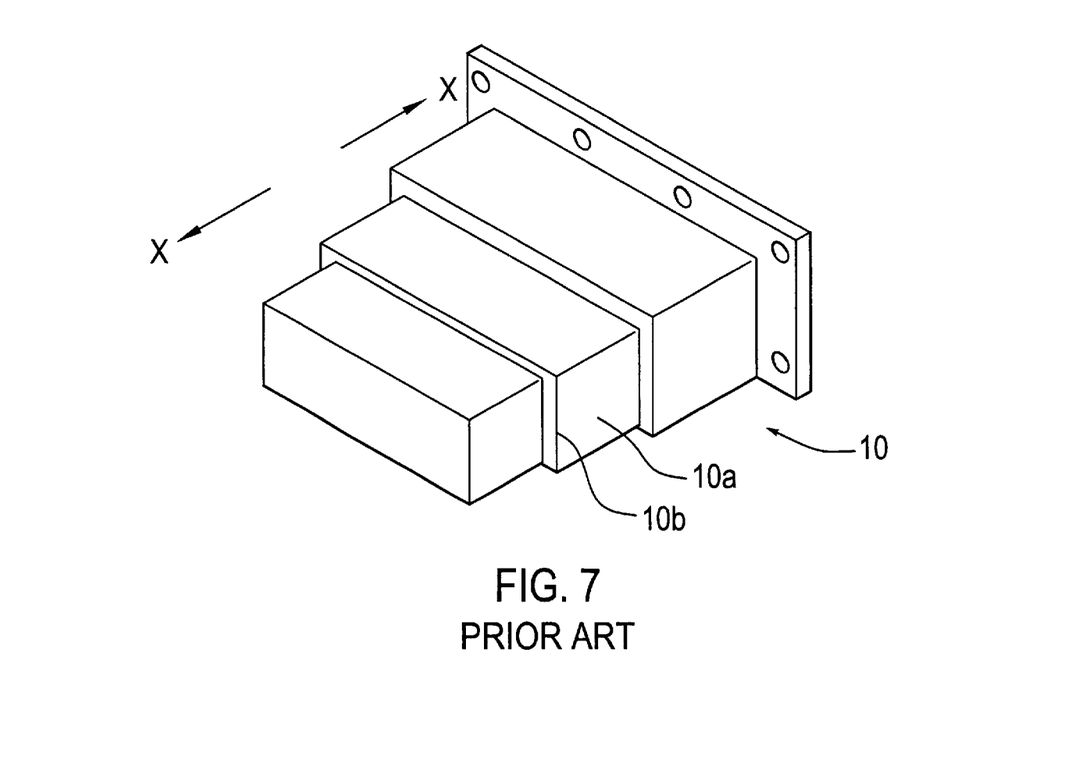
FIG. 7 shows a telescopic cover used as a foundation plate cover in the prior art.

For example, a telescopic cover 10 in the configuration shown in FIG. 6 may be used as a spindle cover for a spindle 20 which is movable in the direction of arrows Y in FIG. 6, or may be used in the configuration shown in FIG. 7 as a foundation plate cover movable in the direction of arrows X in FIG. 7.

A like telescopic cover 10 does, however, present various drawbacks. For one thing, the telescopic cover 10 is generally comprised of steel so as to present a very high weight if used for large machines requiring a large-size protective cover, thus resulting in an increased expenditure of force on the moving mechanism of, for example, spindle 20. (Telescopic covers are customarily also only used at low moving speeds owing to their weight.) This additional expenditure of force must be taken into consideration when designing the moving mechanism of spindle 20 in order to eliminate additional sources of malfunction, and results in excessive energy input of the moving mechanism of spindle 20, resulting in increased operational costs of the machine. In order to reduce the expenditure of force, the telescopic covers 10 are generally guided or held, respectively, by sliders or rollers (not shown).

In order to prevent chips or the like from penetrating between the individual components 10a of the telescopic cover 10, it is moreover necessary to provide at one end 10b of components 10a a stripper (not shown) preventing such penetration of chips or the like. It is furthermore difficult to use these telescopic covers 10 in cases where it is required to move, for example, a spindle 20 not only in one but in two directions. Finally the manufacturing expenditure is comparatively high owing to the many different components, e.g., the variously sized single components 10a of the telescopic cover 10, the sliders or rollers etc., and the telescopic cover 10 is thereby altogether rendered expensive.

Figure 8:
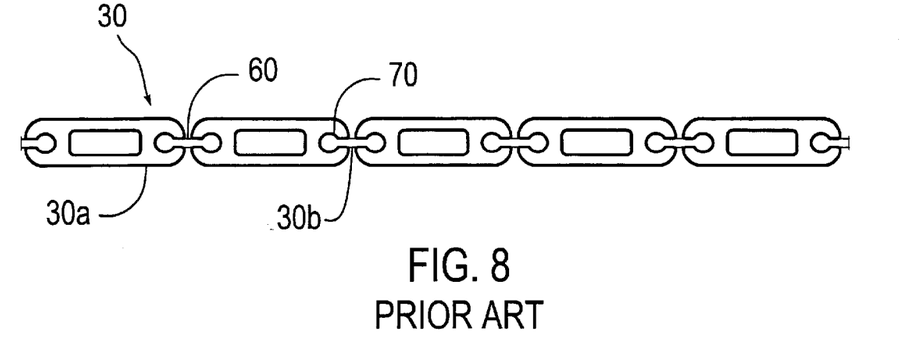
FIG. 8 is a cross-sectional view of a slatted apron in the prior art.
Figure 9:
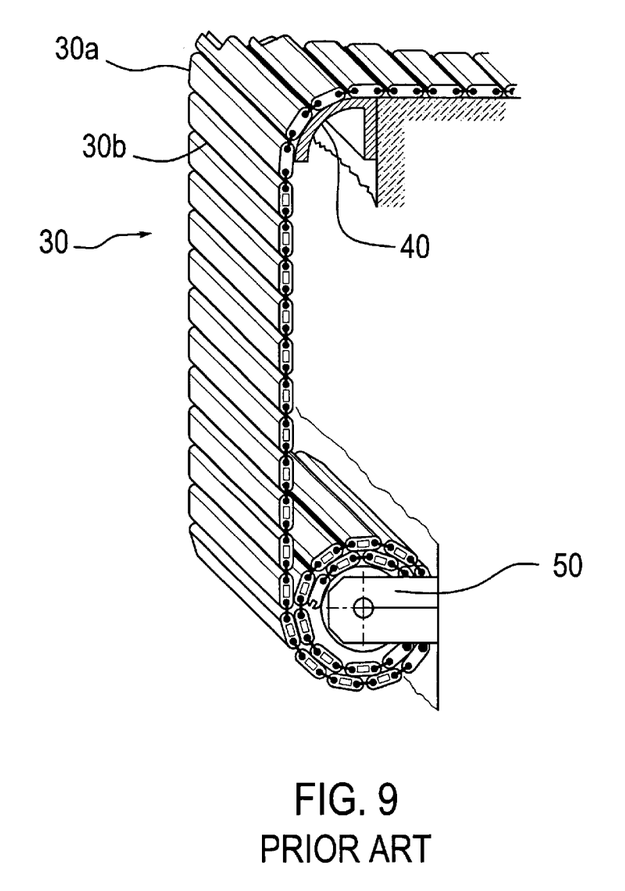
FIG. 9 shows an example for deflection and reeling of the slatted apron in the prior art.

Another possibility of a protective cover for a machine is shown in FIGS. 8 and 9. This configuration is a so-called slatted apron 30. This slatted apron 30 is comprised only of two different single components, a slat or link 30a, and a link connector 30b. This slatted apron 30 presents various advantages over the above mentioned telescopic cover 10. For example, the slatted apron 30, the links 30a of which are preferably comprised of aluminum and the link connectors 30b thereof preferably of polyurethane, have a lower weight in comparison with the telescopic cover 10. Moreover in the case of the slatted apron 30 there is the possibility of simply deflecting it by means of a deflection device 40 (cf. FIG. 9). Moreover the slatted apron 30 may just as easily be rolled up by means of a reeling device 50. Accordingly, the slatted apron 30 quite readily offers the option of adapting it to the respective demands put to a protective cover, and it is also very easily possible in the case of the slatted apron 30 to provide a protective cover for a machine, which is suitable for two different directions of movement of, for example, a spindle of the machine. Articulated aprons 30 equally allow for very high moving velocities of up to 100 m/min as a result of their comparatively low weight The slatted apron 30 as shown in FIGS. 8 and 9 does, however, present the following drawbacks.

Due to an intermediary zone 60 (cf. FIG. 8) between respective adjacent links 30a, there is the possibility of chips or the like accumulating on surfaces of the link connector 30b connecting the links 30a. In particular, there accordingly exists the possibility of chips or the like entering into a connection zone 70 of a link 30a and a link connector 30b and jamming or becoming wedged therein. As a result of the chips or the like, the useful life of the slatted apron 30 is reduced because, for example, the link connector 30b may be damaged by the chips etc. Moreover there is a possibility—where the slatted apron 30 is designed such that the links 30a and the link connector 30b extend in the vertical direction and the direction of movement of the slatted apron 30 is in the horizontal direction—of chips entering into guide means (not shown) attached to the bottom side in the direction of movement of the slatted apron 30 and also becoming jammed or wedged there, with the result that jolting movements of the slatted apron 30 may occur, or in a worst case the movement of the slatted apron 30 will be inhibited entirely.

SUMMARY OF THE INVENTION

Accordingly, it is the object of the present invention to solve the above mentioned problems in the prior art and to furnish a slatted apron which permanently maintains reliable movability at low resistance during operation.

According to the invention, this object is attained by means of a slatted apron in accordance with claim 1.

Further advantageous configurations of the present invention are the subject matters of the subclaims.

According to the invention, a slatted apron is provided wherein two respective links of a plurality of links are connected in an articulated manner. In addition, links having a rectilinear relative orientation are arranged such that portions of their lateral surfaces are contiguous. Accordingly, the slatted apron in accordance with the invention presents the advantage that as a result of the mutually contiguous or immediately adjacent portions of the lateral surfaces, accumulation of chips in an intermediary zone between adjacent links may be prevented thanks to the absence of such an intermediary zone. In consequence, in the case of this link chain there is moreover no possibility of chips etc. becoming jammed or wedged in a zone between links of the slatted apron and causing damage to the slatted apron.

The configuration of the slatted apron may be realized such that the slatted apron may be deflected at a predetermined radius, resulting in very easy adaptability of the slatted apron to various applications.

The lateral surfaces may contact each other by portions adjacent to major surfaces serving as cover surface portions, so that the individual major surfaces of the links are flush in the extended position.

The Individual links of the slatted apron preferably form a smooth overall surface In the extended position. Where vertical mounting is such that the links extend in a vertical direction and the direction of movement of the slatted apron is a horizontal one, chips may thus be prevented from dropping into guide means mounted downwardly in the moving direction of the slatted apron inasmuch as gaps do not exist between the slatted apron and the guide means, whereby Jamming or wedging of chips in the guide means may be prevented.

The slatted apron may moreover include a stripping device which may be a fixed stripper or a brush for stripping matter such as, for example, chips present on the slatted apron, to thereby ensure even better reliability of the slatted apron in operation.

The slatted apron may moreover be designed such as to be reelable on a reeling device, enabling simple adaptability to various applications, wherein the reeling device may be accommodated within a cover.

The stripping device may preferably be mounted in such a way that chips are removed prior to entering into the stripping device, wherein the stripping device may be provided both on the cover and at a distance from the cover, whereby matter present on the slatted apron may be prevented from entering into the cover.

In order to form the closely adjacent portions of the lateral surfaces of the links and the smooth overall surface, the individual surfaces of the links may be designed to be planar, and the closely adjacent portions of the lateral surfaces of the links perpendicular to the planar surface.

For the purpose of weight reduction, the single links may moreover present a cavity.

Moreover a link connector may be provided between two respective adjacent links of the slatted apron so as to interconnect these links.

For reliable connection of the individual links, the link connectors may finally present a center portion having parallel upper and lower surfaces and two end portions presenting a circular cross-sectional configuration, and the links may present a recess corresponding to an end portion and part of the center portion of the link connector.

BRIEF DESCRIPTION OF THE DRAWINGS

The present invention shall now be explained in detail by way of the description of embodiments making reference to the annexed drawings, wherein.

DETAILED DESCRIPTION OF PREFERRED EMBODIMENTS

Embodiments of the present invention will now be described.

The description of a first embodiment of the present invention will be given in the following.

Figure 1:
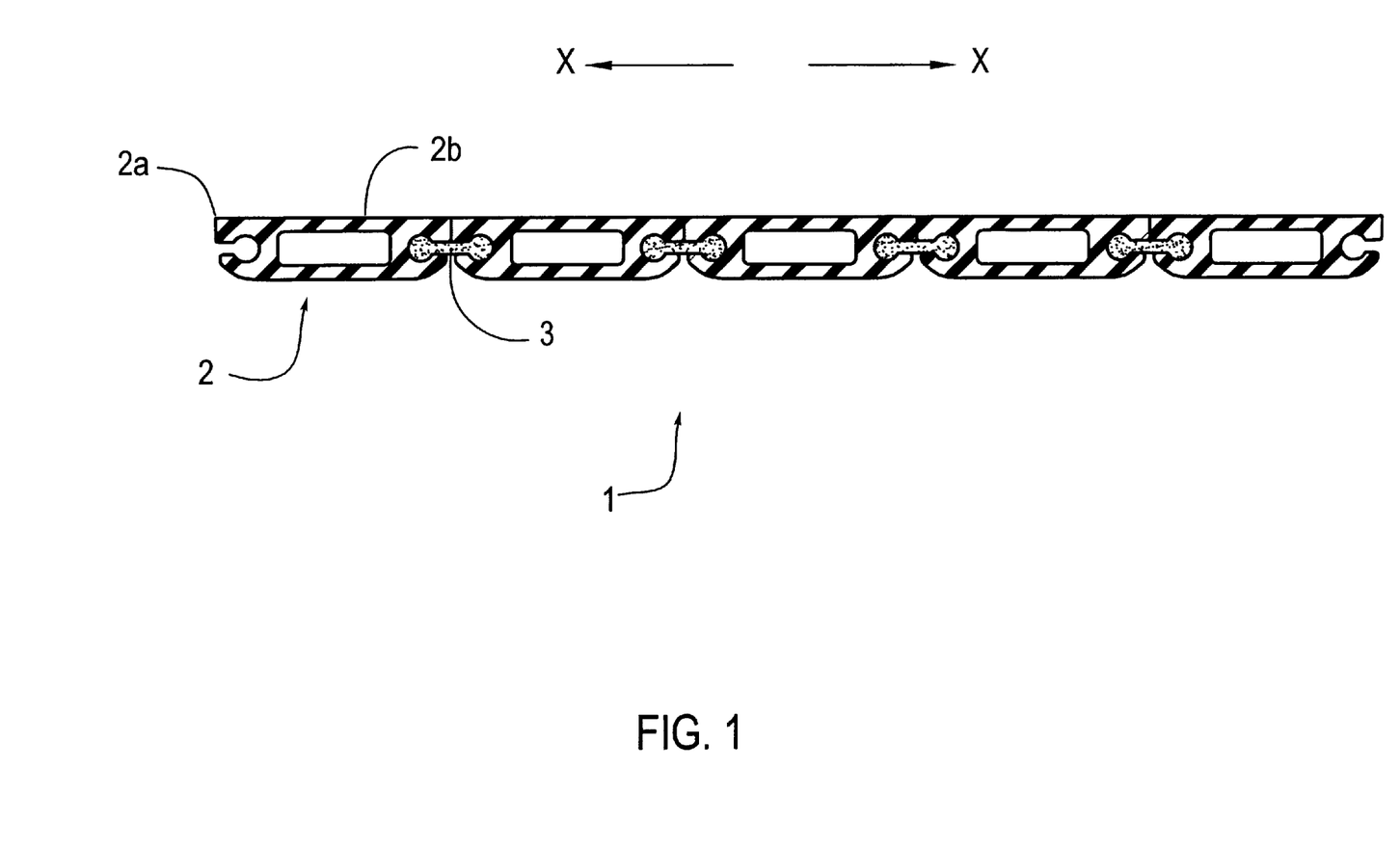
FIG. 1 is a cross-sectional view of a slatted apron in accordance with a first embodiment of the present invention.

Reference is made to FIG. 1. A slatted apron 1 in accordance with the first embodiment of the present invention is comprised of a plurality of links 2 and a plurality of link connectors 3. The links 2 may, for example, consist of aluminum or an aluminum alloy, and the link connectors 3 may, for example, consist of polyurethane which is resistant against coolant required in a processing performed by a machine using the slatted apron as a protective cover. Where magnesium is to be processed, the links 2 are preferably made of stainless steel. Adjacent links 2 of the slatted apron 1 are interconnected through one of the link connectors 3. When the single links 2 are oriented rectilinearly along the direction of arrows X in FIG. 1. i.e., when in an extended condition of being aligned along a straight line, portions 2a of lateral surfaces of two adjacent links 2 are immediately adjacent each other, so that between the single links 2 there is no intermediary zone exposing the link connector 3 with respect to a protective surface (the upper surface in FIG. 1) of the slatted apron 1. Moreover the single surfaces 2b of the single links 1 preferably form a smooth overall surface in the above mentioned extended condition, whereby the following additional advantage may be achieved. When the links 2 and the link connector 3 of the slatted apron 1 are arranged vertically and the direction of movement of the slatted apron 1 is horizontal, i.e. in a case where FIG. 1 represents a top view of the slatted apron 1, chips or the like accumulated on the slatted apron 1 may be prevented from sliding off the slatted apron 1 and dropping into guide means (not shown) mounted on the lower side of the slatted apron 1 in the direction of movement of the slatted apron 1, because there is no gap between the smooth protective surface of the slatted apron 1 and the guide means.

Figure 3:
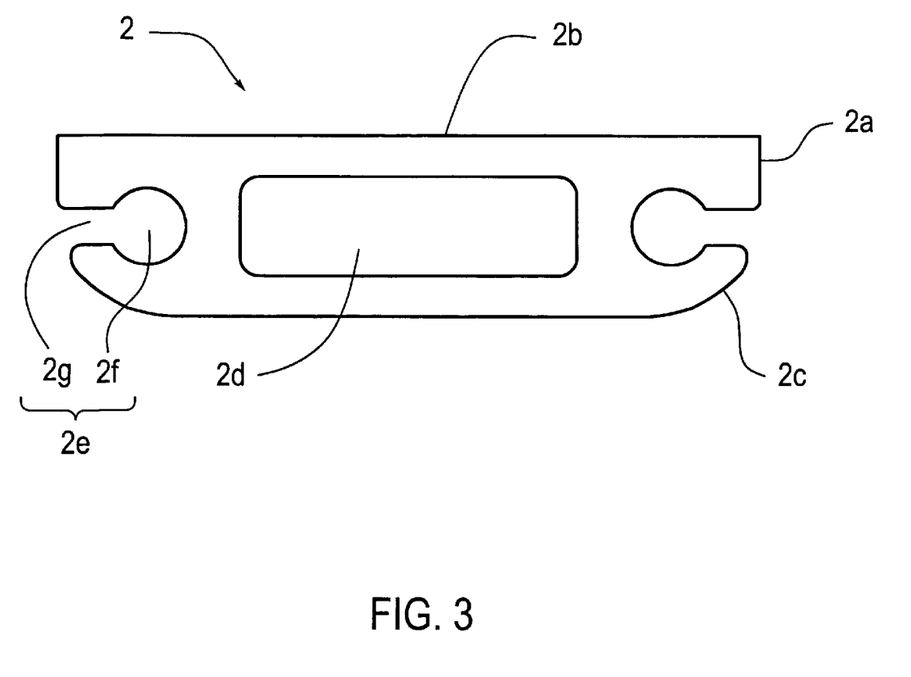
FIG. 3 is a cross-sectional view of a single link of a slatted apron in accordance with the first or second embodiment of the present invention.

The detailed structure of a single link 2 preferably used in this embodiment is shown in FIG. 3. As can be seen therefrom, this link 2 presents the smooth surface 2b. The portion 2a of a lateral surface of the link 2 which is contiguous with a corresponding portion 2a of a lateral surface of an adjacent link 2 in the extended condition is designed such as to form a right angle with surface 2b of link 2. The remaining portions 2c of the lateral surface of link 2 present a curved shape or a deflection radius, respectively, so that the slatted apron 1 (cf. FIG. 1) comprised of such links 2 may be deflected at a predetermined radius at which the neighboring links may roll along the curved shape. For the purpose of weight reduction, each link 2 may present a cavity 2d, with a sufficient mechanical strength of the link 2 equally being preserved in the presence of this cavity 2d.

The link 2 moreover presents a recess 2e at each lateral surface. This recess 2e corresponds in its conformation to a part, preferably essentially one half, of link connector 3 (cf. FIG. 1) used in the slatted apron 1. In the first embodiment of FIG. 1 such a link connector 3 is used which presents in the cross-sectional view shown in FIG. 1 a center portion having parallel surfaces and lower surfaces and one respective end portion having a circular conformation at each end of the center portion. Accordingly, the recess 2e in the case of link 2 in FIG. 3 presents a circular recess 2f In cross-sectional view and a recess 2g having parallel upper and lower surfaces which are capable of receiving one of the two end portions and part of the center portion of the link connector 3 in such a way that the slatted apron 1 shown in FIG. 1 is thereby formed. In other words, each recess 2e receives substantially one half of the link connector 3, so that no intermediary zone is present between single links 2 of the slatted apron 1.

The following is a description of a second embodiment of the present invention.

Figure 2:
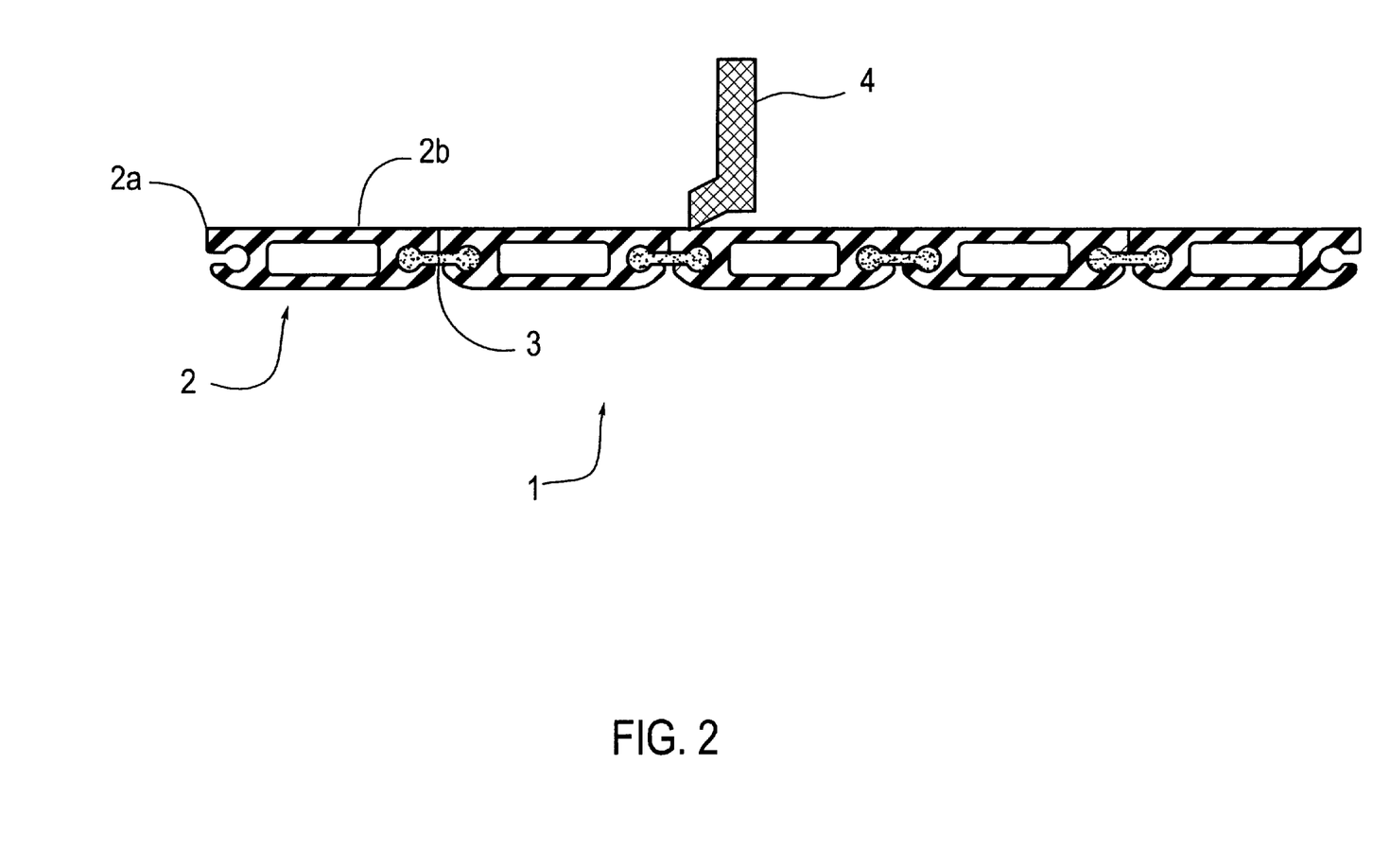
FIG. 2 is a cross-sectional view of a slatted apron in accordance with a second embodiment of the present invention.

Reference is made to FIG. 2. The second embodiment of the present invention is identical with the above explained first embodiment of the present invention as explained by referring to FIGS. 1 and 3. with the exception that a stripping device 4 is additionally provided for eliminating matter occurring on the surface 2b of links 2 such as, for example, chips, coolant or the like, when the slatted apron 1 is used as a protective cover for a machine. This stripping device may, as is shown in FIG. 2. be a fixed stripper. There is, however, also the possibility of using a brush as the stripping device instead of the fixed stripper.

The following is a description of a third embodiment of the present invention.

Figure 4:
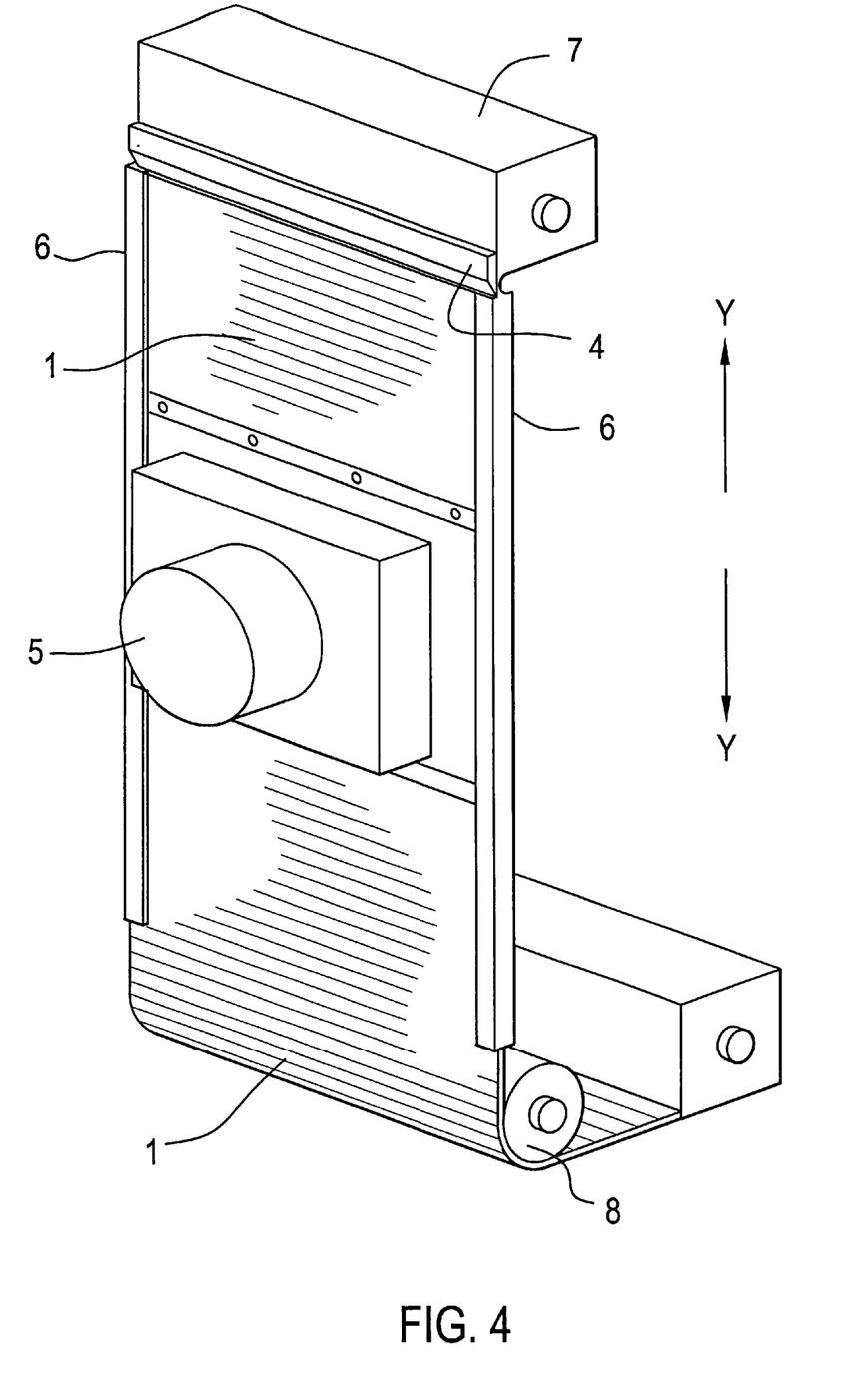
FIG. 4 is a perspective view of a protective cover of a machine by means of slatted aprons in accordance with a third embodiment of the present invention.

The structure shown in FIG. 4 represents the third embodiment of the present invention, wherein the slatted aprons 1 in accordance with the first or second embodiment of the present invention are used as a protective cover for a machine such as, for example, a spindle cover, wherein a spindle 5 is movable in the direction of arrows Y in FIG. 4. This means that the embodiment shown in FIG. 4 is an application wherein the protective cover is displaceable merely in one direction. The spindle 5 is located between two slatted aprons 1 guided by means of guide means 6 which are mounted on both sides of the slatted aprons 1 in the direction of movement of the slatted aprons 1. Each slatted apron 1 has one end fixedly attached to the spindle 5. The upper slatted apron 1 moreover includes a reeling device (not shown) similar to the one shown in FIG. 9 for the prior art and accommodated in a cover 7. Preferably, but not of necessity, a stripping device 4 may be provided. In FIG. 4 this stripping device 4 is mounted on cover 7, however it may also be provided in front of cover 7. This stripping device 4 prevents matter accumulated on the slatted apron 1 such as, for example, chips from entering into cover 7. The lower slatted apron 1 in FIG. 4 has the same arrangement as the upper slatted apron 1, with the exception that the lower slatted apron 1 is deflected by means of a deflection device 8.

When the spindle 5 is reciprocatingly moved in the direction of arrows Y In FIG. 4 in accordance with a predetermined processing performed by a machine, the above described protective cover formed by the two slatted aprons 1 will always remain closed due to the fact that one end of each slatted apron 1 is fixedly mounted on the spindle 5 such as, for example, a milling head of a machine such as, for example, a milling machine, and the other end of each slatted apron 1 is reeled up or reeled off by the reeling device (not shown) in conformity with the movement of spindle 5. Inasmuch as in the above described protective cover the slatted aprons 1 in accordance with the first or second embodiment are used, matter present on the slatted apron 1 such as, for example, chips produced as a result of processing by the machine are prevented from getting into the connection zone between link connectors 3 and links 2 (cf. FIG. 1) of the slatted apron 1. When the structure shown in FIG. 4 is rotated to the right by 90°, i.e., when the slatted apron 1 is arranged such that the single links 2 (cf FIG. 1) are arranged in the vertical direction and the direction of movement of the slatted apron 1 is horizontal, matter present on the slatted apron 1 may moreover be prevented from dropping into the guide means of the slatted apron 1 arranged underneath in this case, because the slatted apron 1 preferably presents a planar overall surface when the slatted apron presents the extended condition mentioned when referring to FIG. 1, for consequently there is no gap between the slatted apron 1 and the guide means 6. Reliable mobility of the slatted apron 1 may thus be ensured, wherein jolting movements, or inhibition of movement altogether due to jamming or wedging of chips etc. dropping into the guide means 6 are eliminated.

The following is the description of a fourth embodiment of the present invention.

Figure 5:
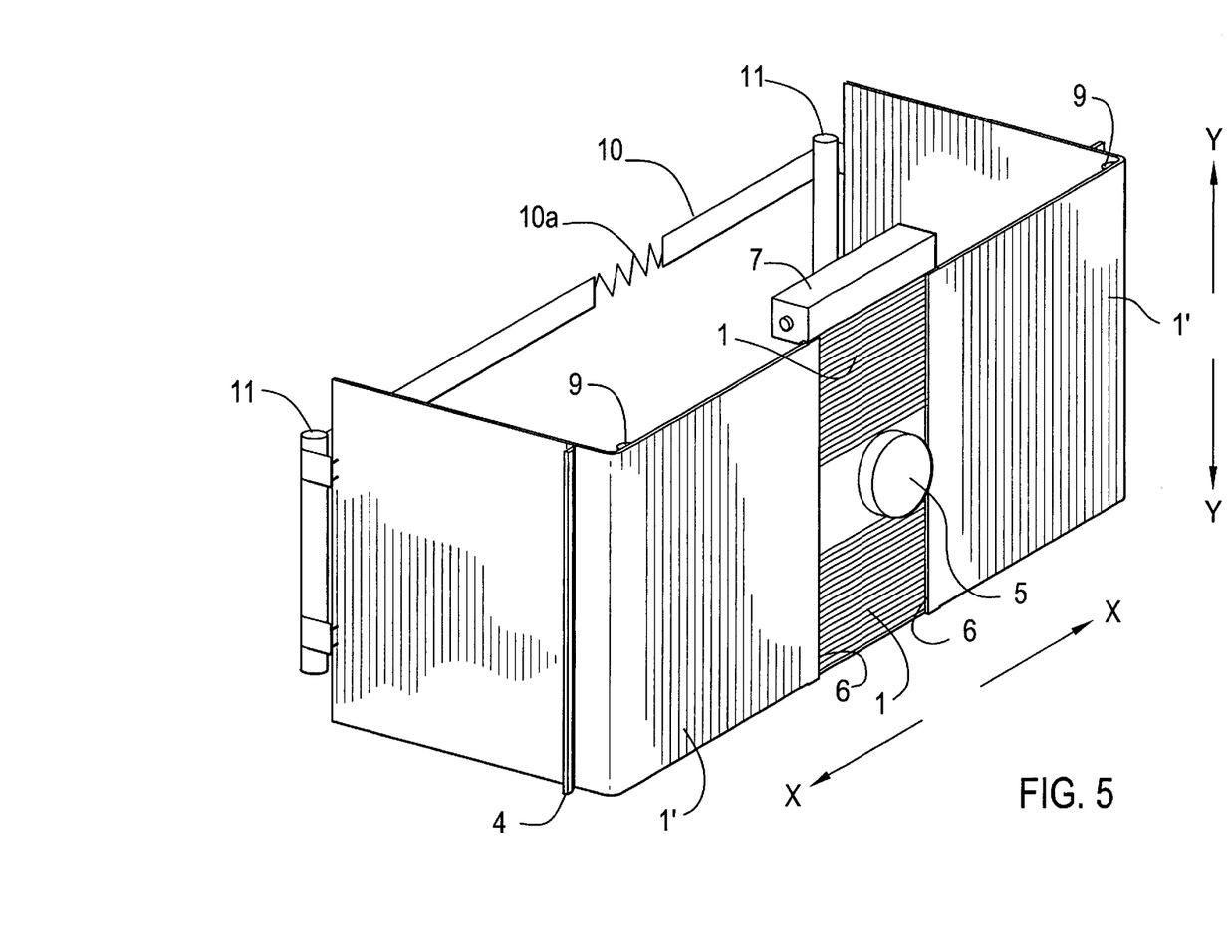
FIG. 5 is a perspective view of a protective cover of a machine by means of slatted aprons in accordance with a fourth embodiment of the present invention.

In FIG. 5 as a fourth embodiment of the present invention the application of the slatted apron 1 of the first or second embodiment of the present invention is shown on a spindle cover of a machine having a spindle which is movable in two directions, i.e., the directions of arrows X and Y in FIG. 5. Herein the structure of the protective cover in the direction of arrows Y largely corresponds to the structure shown in FIG. 4, and a detailed description thereof is therefore omitted. In the direction of arrows X, a slatted apron 1' is arranged on each side of a spindle 5. In order to eliminate undesirable matter present on the slatted apron 1', brushes are provided for each slatted apron 1' as a stripping device 4. One end of each of these two slatted aprons 1' is fixedly connected with a respective guide means 6 on one side of the slatted aprons 1 movable in the direction of arrows Y. The slatted aprons 1' are deflected by substantially 90° with the aid of one respective deflection roller 9. The other ends of each slatted apron 1' are connected to at least one traction ribbon 10, with two traction ribbons 10 being provided in the configuration in FIG. 5. These traction ribbons 10 are deflected with the aid of two deflection rollers 11 in such a way as to extend in parallel with the surface in which spindle 5 is arranged. In the center of the traction ribbons 10, a flexible portion 10a presenting a spring effect is arranged.

The function of the above specified structure is as follows. When the spindle 5 is moved in the direction of arrows Y, the slatted aprons 1 movable in this direction form a cover as was already described by referring to FIG. 4. When the spindle 5 is, on the other hand, moved in the direction of arrows X, the above mentioned structure of slatted aprons 1 is moved together with the spindle 5 in the direction of arrows X, for the slatted aprons 1' movable in the direction of arrows X have one end fixedly attached to the guide means 6 for the slatted aprons 1 movable in the direction of arrows Y. By way of the traction ribbons 10 attached to the other ends of the slatted aprons 1' movable in the direction of arrows X and presenting a flexible portion 10a a having a spring effect, in the case of a movement in the direction of arrows X for example from the left to the right in FIG. 5, the slatted apron 1' arranged on the right side of spindle 5 is moved from the left to the right, the traction ribbons 10 are accordingly moved from the right to the left, and consequently the slatted apron 1' arranged on the left side spindle 5 is moved from the left to the right, whereby a reliable spindle cover is ensured which is suitable as a protective cover for a machine requiring movement of the spindle thereof in two different directions at the same time.

In accordance with this embodiment, the advantages already described with respect to the first to third embodiments are equally obtained.

In particular when in the above described structure those slatted aprons 1' presenting a smooth overall surface while the individual links are in an extended state along a straight line are used as the slatted aprons 1' movable in the direction of arrows X, chips etc. accumulated on the slatted apron 1' may safely be prevented from dropping into the guide means (not shown) arranged on the lower side in the representation of FIG. 5; due to the smooth overall surface of the slatted aprons 1', no gaps are formed between the guide means and the slatted aprons 1', and as a result chips etc. are prevented from becoming jammed or wedged in the guide means and thus from causing series of jolting movements or from entirely inhibiting a movement of the slatted apron 1'.

The slatted aprons described in accordance with the embodiments of the present invention thus present essential advantages in comparison with other protective covers for machines in the prior art, such as, for example, enhanced reliability through avoiding penetration of chips into a connection zone of a link and a link connector, or penetration of chips into the guide means of slatted aprons having their links oriented in a vertical direction and movable in a horizontal direction.

Concerning further effects and advantages of the invention not explained in detail, reference is specifically made to the disclosure of the figures.

What is claimed is:

1. A slatted apron for covering movable tool machine parts, including:
    a multiplicity of flexibly connected links, each comprising a major surface forming a cover surface portion and lateral surfaces, wherein
    first portions of the lateral surfaces of two adjacent links, which are adjacent the major surface, remain in contact with each other while the two adjacent links are in an extended position, and
    second portions of the lateral surfaces of the two adjacent links, which are remote from the major surface, are provided with curved deflection surfaces along which adjacent links are in contact with each other during a relative rotation of the two adjacent links.
2. The slatted apron in accordance with claim 1, wherein the major surfaces of the links are flush in the extended position.
3. The slatted apron in accordance with claim 1, wherein the major surfaces of the links form a smooth overall surface in the extended position.
4. The slatted apron in accordance with claim 1, further including a stripping device for removing matter present on the major surfaces of the links.
5. The slatted apron in accordance with claim 4, wherein the stripping device is a fixed stripper.
6. The slatted apron in accordance with claim 4, wherein the stripping device is a brush.
7. The slatted apron in accordance with claim 1, further including a reeling device on which the slatted apron may be reeled up with at least a predetermined radius.
8. The slatted apron in accordance with claim 7, further including a cover that accommodates the reeling device.
9. The slatted apron in accordance with claim 8, the stripping device is mounted on the cover and removes matter present on the slatted apron before entering into the cover.
10. The slatted apron in accordance with claim 8, wherein the stripping device is mounted at a predetermined spacing from the cover and removes matter present on the slatted apron before entering into the cover.
11. The slatted apron in accordance with claim 1, wherein the major surfaces of the links are planar, and the first portions of the lateral surfaces of the links closely adjacent in the extended position form a right angle with the major surface of the links.
12. The slatted apron in accordance with claim 1, wherein the links have an internal cavity.
13. The slatted apron in accordance with claim 1, wherein the links are connected by link connectors each located between two respective links.
14. The slatted apron in accordance with claim 13, wherein the link connectors include a center portion having parallel lower and upper surfaces and two end portions, the link connectors having a circular cross-sectional conformation from one end portion through the center portion to the other end portion.
15. The slatted apron in accordance with claim 14, wherein each of the links include a recess having a conformation which accommodates one end portion and a part of the center portion of the link connector.

* * * * *

UNITED STATES PATENT AND TRADEMARK OFFICE
CERTIFICATE OF CORRECTION

PATENT NO. : 6,276,427 B1　　　　　　　　　　　　　　　　　　　　　　　　　　Page 1 of 1
DATED : August 21, 2001
INVENTOR(S) : Karl Heinz Eisner It is certified that error appears in the above-identified patent and that said Letters Patent is hereby corrected as shown below:

Title page,
Item [22], PCT Filed, change "November 17, 2000" to -- November 17, 1998 --.

Signed and Sealed this

Fourteenth Day of May, 2002

Attest:

JAMES E. ROGAN
Attesting Officer　　　　　　　　　　*Director of the United States Patent and Trademark Office*